April 20, 1937.  C. J. WESTIN  2,077,654
TUBE CLOSING MACHINE
Filed May 4, 1934   7 Sheets-Sheet 2
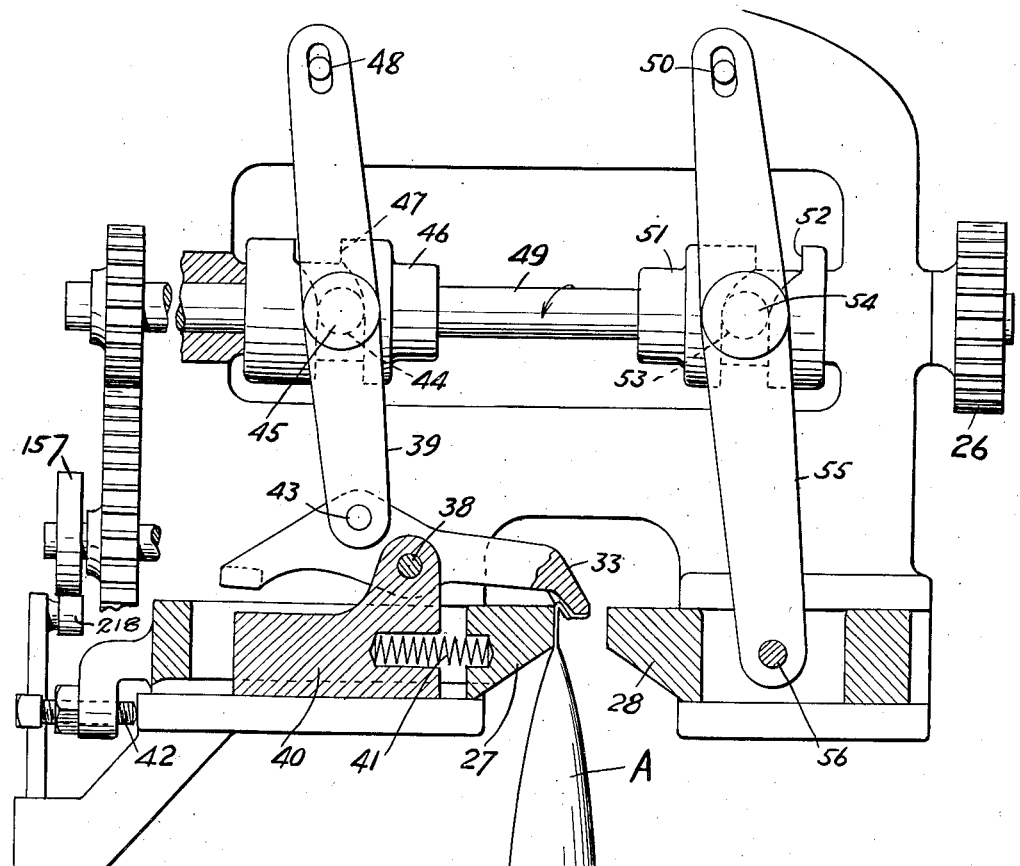
FIG. 5.
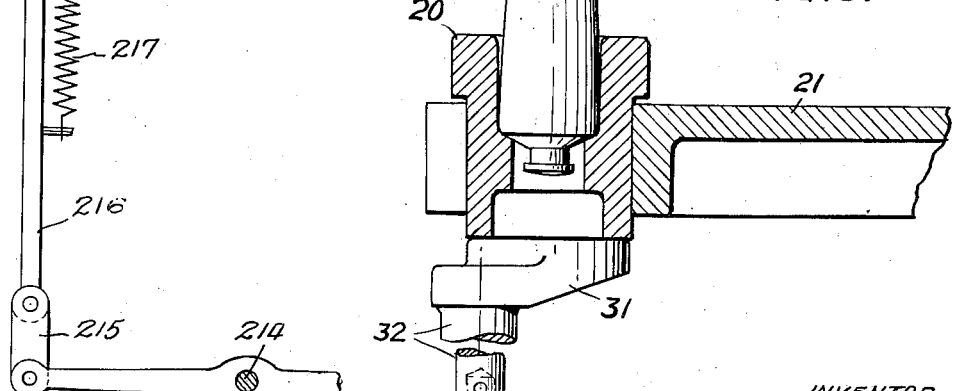
WITNESS:
INVENTOR
Charles J. Westin
BY Augustus B. Stoughton
ATTORNEY April 20, 1937.                   C. J. WESTIN                    2,077,654
                              TUBE CLOSING MACHINE
                              Filed May 4, 1934            7 Sheets-Sheet 3

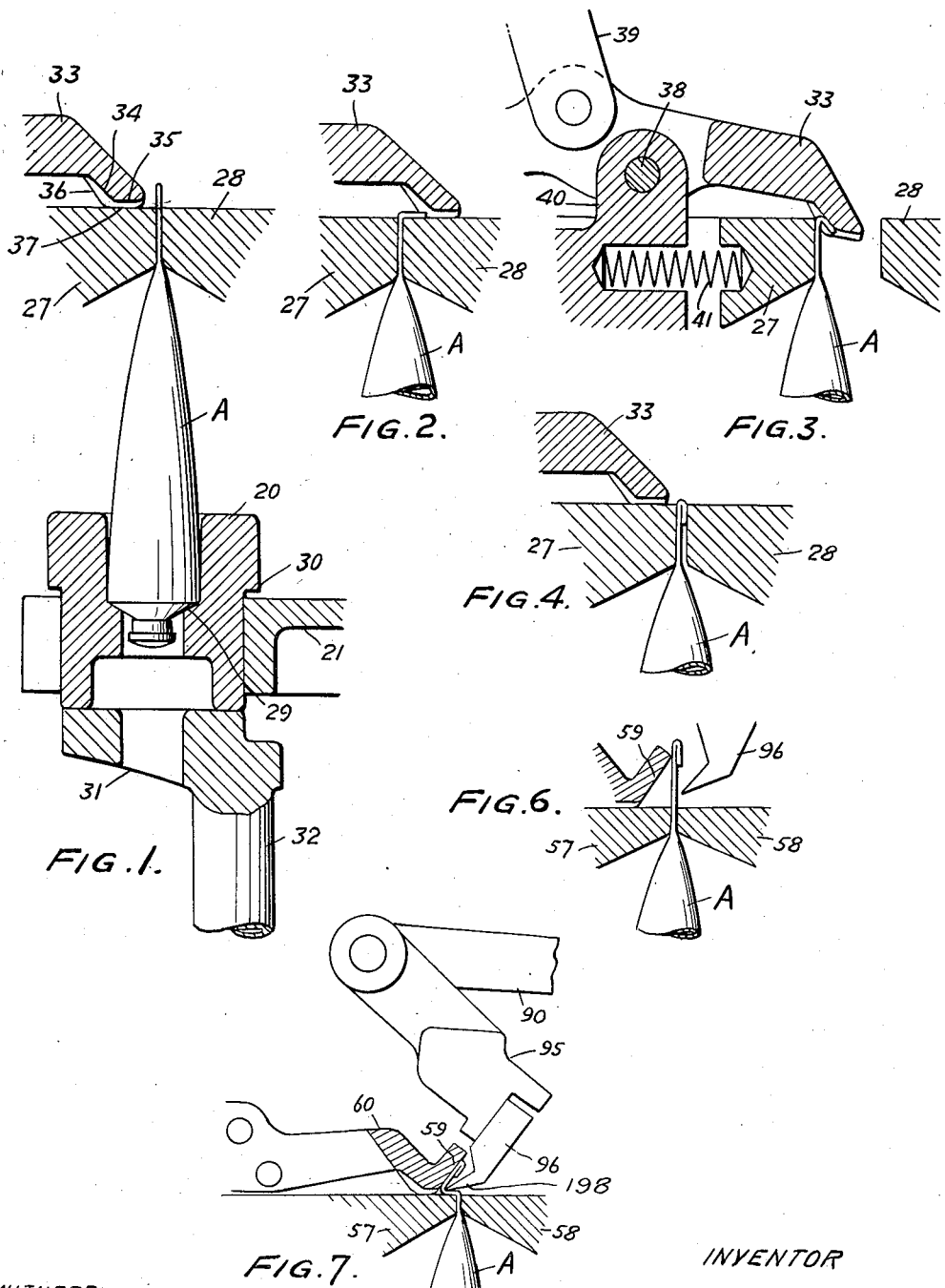

WITNESS:                                              INVENTOR
Rob't P. Litchel                                 Charles J. Westin
                                                   BY
                                                   Augustus B. Stoughton
                                                        ATTORNEY.

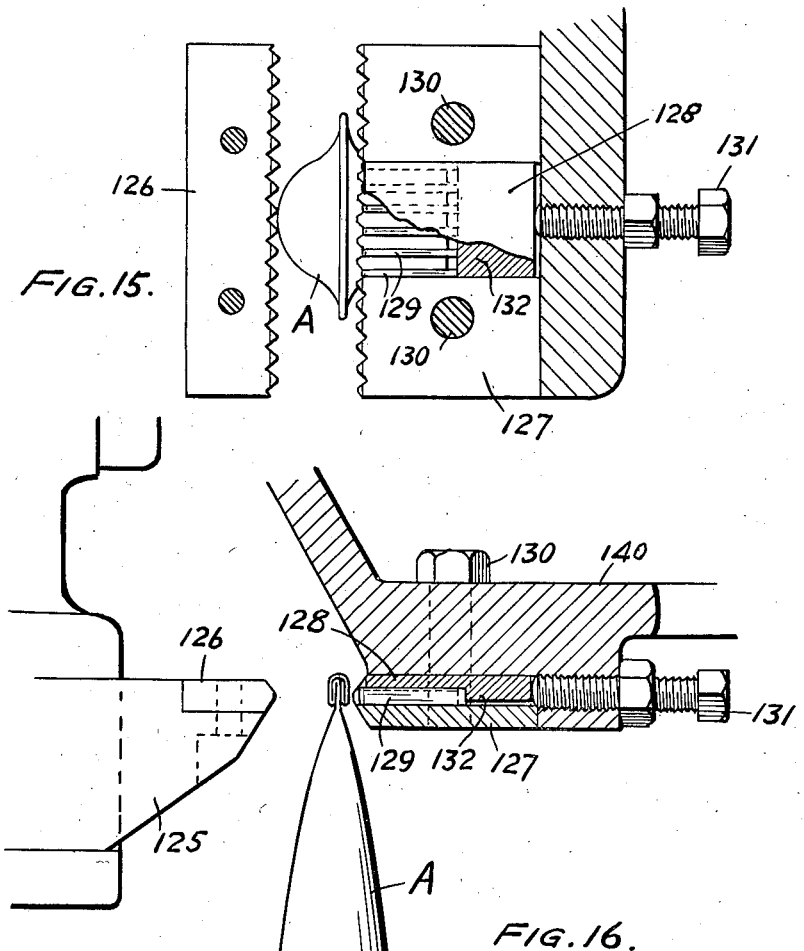

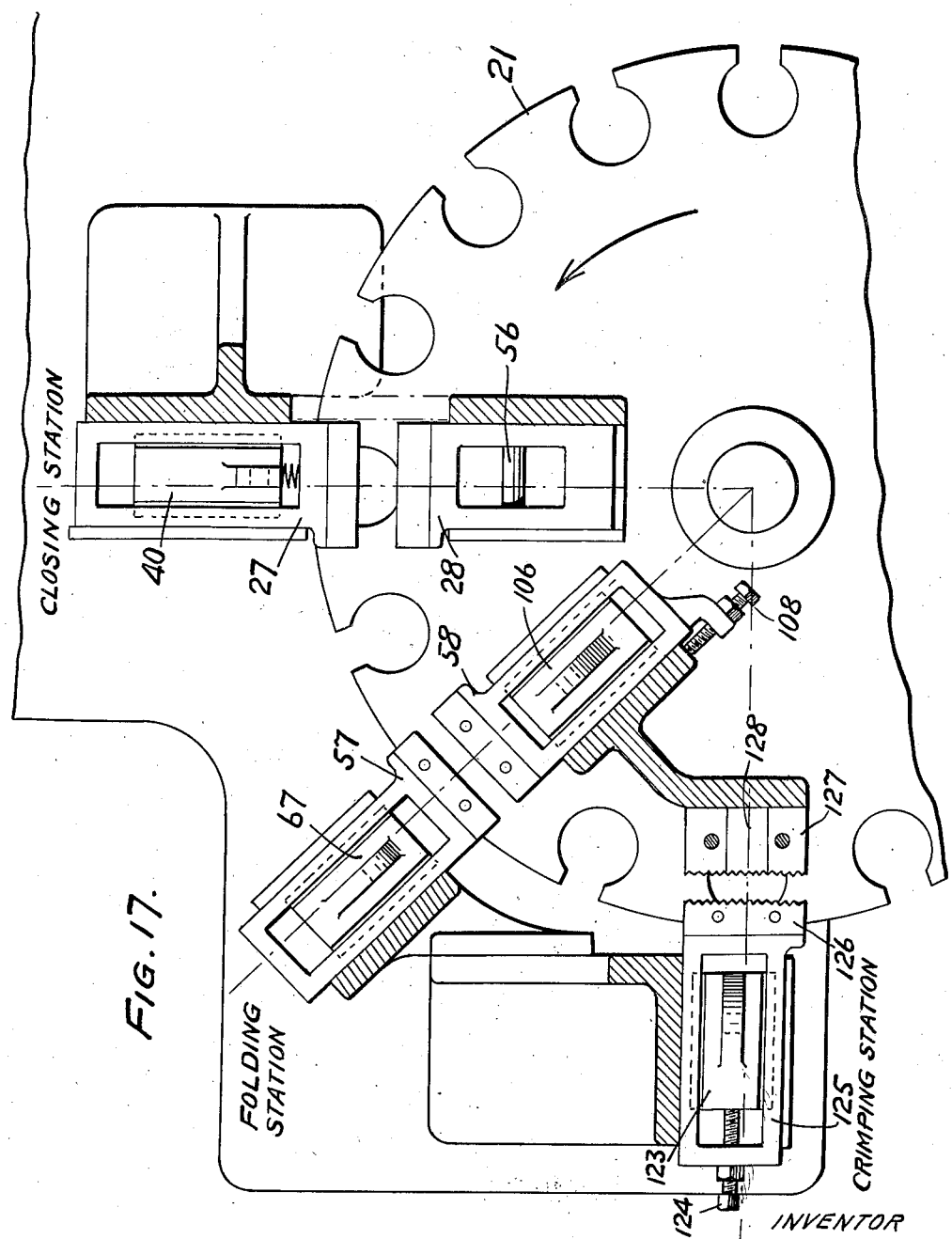

Patented Apr. 20, 1937

2,077,654

UNITED STATES PATENT OFFICE 2,077,654

TUBE CLOSING MACHINE

Charles J. Westin, Philadelphia, Pa., assignor to F. J. Stokes Machine Company, Philadelphia, Pa., a corporation of Pennsylvania Application May 4, 1934, Serial No. 723,924

13 Claims. (Cl. 113—54)

The present invention pertains to tube-closing machines and, particularly, to improvements in the mechanism producing a new and improved type of collapsible tube closure.

The preferred embodiment of my invention, as disclosed in the accompanying specification and shown in the attached drawings, may be used as a self-contained machine for the automatic handling of the tubes, or as a unit in combination with other units, for example, filling units, to form an automatic filling, closing and sealing machine.

One purpose of my invention is to provide a tube-closing machine with simple, efficient and reliable mechanism for satisfactorily performing the operations of: first, supporting and conveying a plurality of tubes in timed and spaced relation to the several stations of the co-operating mechanisms; second, closing the tube (filled or empty) by spreading the open end and flattening the opposite walls against each other for a predetermined distance from the end of the tube, thereby providing the stock used in making the closure; third, making an equal number of folds in each side of the standing part or central axis of the tube; fourth, crimping or indenting the folds to lock them together; and, fifth, marking characters or code numbers on the beads formed between the indentations of the closure.

It is also the purpose of my invention to provide practical means for producing narrow folds on tubes made from any metal or alloy, such as tin, lead or aluminum, as the resulting production economy in the saving of material is of great importance to large users of tubes. Those versed in the art recognize the difficulty of making short, even folds without distorting the tube, particularly on tubes made from hard or stiff material, for example, aluminum. I therefore flatten the tube, as mentioned above, a sufficient distance to provide the stock used in the closure, the stock herein referred to comprising two thicknesses of tube wall, and arrange the sequence of folding so that not more than one thickness of stock is bent at any one time.

Another purpose of flattening the tube a distance approximately equal to the length used for the closure is to eliminate the air from within the tube. If, for example, the tube was flattened only for the first fold, the air below this point would be compressed as the succeeding folds were made, and, when the tube was released from the crimping station, this compressed air would exert pressure tending to open the folds, causing defective tubes.

The type of tube closure produced by this invention is disclosed and claimed in United States Patent No. 1,852,225, granted to me on April 5, 1932, and the process of making the closure is disclosed and claimed in my co-pending application Serial No. 648,919, filed December 27, 1932, now Patent No. 1,989,032. The preferred type of crimping or indentations of the closure is disclosed and claimed in my co-pending application Serial No. 641,553, filed November 7, 1932, now Patent No. 1,989,031.

For a further exposition of my invention, reference may be had to the annexed drawings and specification, at the end thereof my invention will be specifically pointed out and claimed.

In the drawings:

Figs. 1, 2, 3 and 4 are detail views, with parts in vertical cross-section, showing the steps of making the first fold.

Fig. 5 (on Sheet 2) is a detail view, with parts in vertical cross-section, at the first station.

Figs. 6 and 7 (on Sheet 1) are detail views, with parts in vertical cross-section, showing the preliminary steps in forming the tuck, at the second station.

Fig. 15 is a plan view of the crimping jaws, with parts in horizontal cross-section, at the third station.

Fig. 16 is a side elevation of the crimping jaws, with parts in vertical cross-section.

Fig. 17 is a top plan view of the conveying dial fos the tubes and the closing, folding and crimping jaws, with parts in horizontal cross-section.

Figure 18:
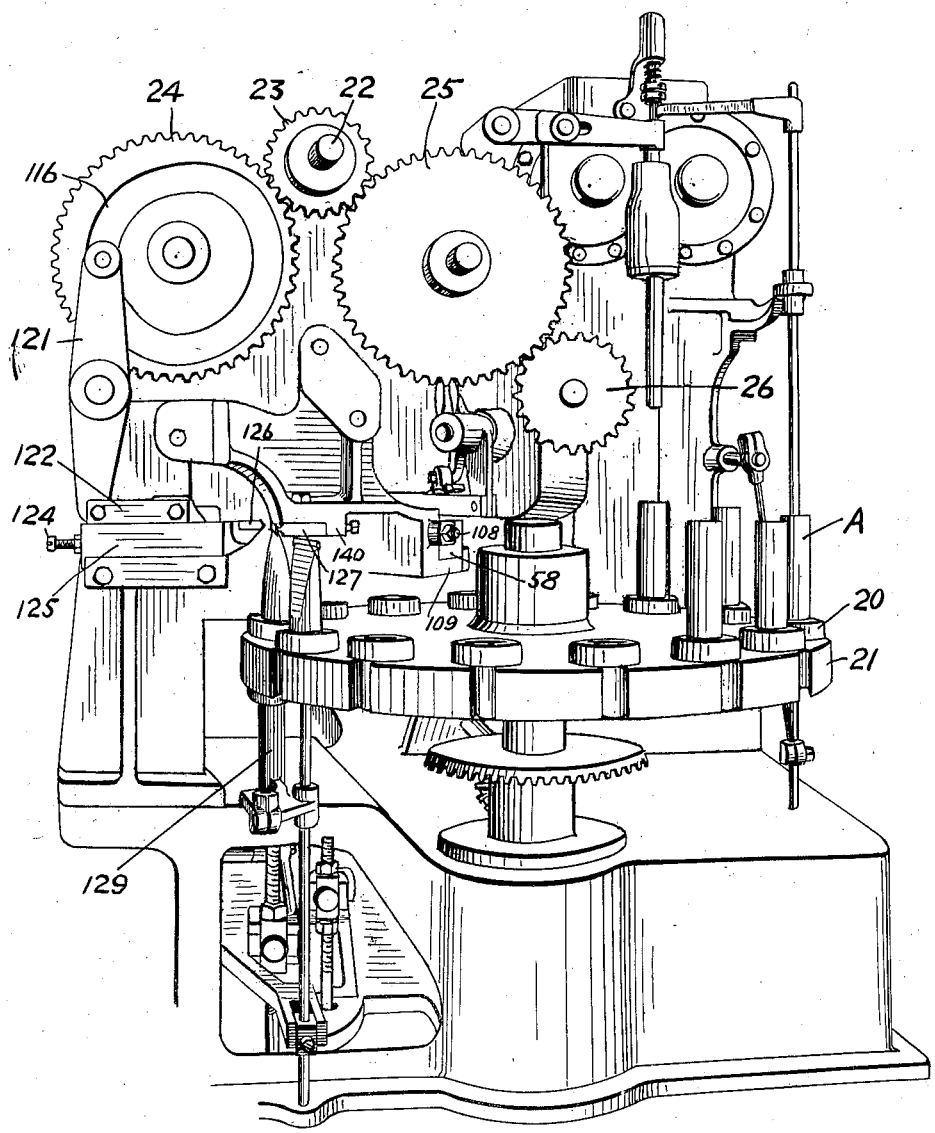
Fig. 18 is a perspective view of parts of my machine, with parts omitted to permit of greater clarity.

That embodiment of my machine chosen for illustration is driven from any suitable prime mover may be connected, for example, by a belt, to the main drive pulley to which are connected, through gearing or other means, the several countershafts on which the cams are mounted which control and synchronize each move of the mechanism in proper sequence. As is best seen in Fig. 18, a cross shaft 22, at the top of the machine, carries pinion 23 meshing with two similar gears 24 and 25. Gear 24 drives the main cam shaft which carries cams for operating the crimpers, second and third tube-lifters, the tube-ejector, the tuck shoe and the rear tuck jaw. Gear 25 carries, on its own shaft, cams which operate the front tuck jaw and also the creaser. Gear 25 is also in mesh with a gear 26 which operates the pressing jaws at the tube-closing station.

The tubes A are held in tube-cups 20, supported and conveyed in spaced relation by the dial 21, which has an intermittent or step-by-step motion imparted to it by means well known and not necessary to describe, such as a Geneva gear. Any type of conveyor, as for example a chain, may be used as long as the tubes are rigidly supported and properly indexed up with the several stations.

As the tubes A are conveyed step-by-step towards the closing station, Fig. 17, they pass a preformer or spreader (not shown) which elongates the top of each normally circular tube, and thus prepares it for the closing jaws 27 and 28. The preferred type of preformer is disclosed and claimed in my co-pending application Serial No. 676,911, filed June 21, 1933.

The preformed tube is conveyed to a proper alignment between the closing jaws 27 and 28, these jaws being a suitable distance apart during the movement of the dial 21, and, as the dial comes to rest, the jaws close in on the tube to flatten the walls as shown in Fig. 1.

It is understood that either the closing jaws or the dial is adjustable for height in relation to each other, so that tubes of any length within the range of the machine can be closed. In this case, I prefer to make the dial 21 adjustable and set it at such a distance from the jaws 27 and 28 that the tube will extend above the top faces of the jaws a distance slightly less than the length of the first fold. It is evident that the flattened tube, as shown in Fig. 1, must be shorter than the cylindrical tube with the perpendicular walls from which the flattened tube was formed by the flattening jaws 27—28. The shrinkage in length, of course, is more noticeable in the larger diameter tubes. I have found that, with the jaws 27 and 28 made of a width suitable to contact with and flatten the walls for a distance approximately equal to the length of stock required in making the folds, the shrinkage in tube length has a tendency to lift the tube from the supporting shoulder 29 in the cup 20, or, if the tube fits tightly in the cup, both tube and cup are lifted and after the first bend is made, as shown in Fig. 2, and the tube released by the jaws, as in Fig. 3, the tube and cup would drop down or the tubes would be pushed back on shoulder 29 again by the folder shoe 33. This would produce variations in the length of the first fold, causing difficulties in the succeeding operation, and the resulting finished closure would not have folds of even length on the opposite sides. As can be learned from Fig. 5, I overcome this difficulty by using a cup-lifter 31, controlled through linkage from cam 157, which is so shaped that the cup 20 is lifted at the moment the jaws 27 and 28 close the tube a suitable distance and with a motion proportioned to the shortening of the tube due to the outline of the operating surface of cam 157. The cup 20 is shown lifted off its seat 30 in Fig. 1. Adjustment is provided for in the linkage of the cup-lifter, so that a lift suitable for the various sizes of tubes can be obtained. A preferred type of adjustment is shown in Fig. 5 and consists in providing a threaded stud 207 fastened to the stem 32 of cup-lifter 31. Stud 207 is adjustable through nuts 208 and 211 with relation to swivel block 210, which is actuated by the lever 213 through the co-operation of trunnions 209 of block 210 with the slots 212 of lever 213. Lever 213 is fulcrumed at 214 and connected through link 215 to plunger 216, which carries cam follower 218 and is pressed against cam 157 by spring 217. This seemingly simple invention has proved very effective, and is an important feature in the successful operation of my machine. The closing operation commences as is shown in Fig. 1. The stock of tube A, projecting above closer jaws 27 and 28, is given a 90° bend against jaw 28 by the movement of the folder-shoe 33 to the position shown in Fig. 2. The folder-shoe 33 is held in this position while jaw 28 slides to the right, permitting the shoe 33 to drop down, by the combined action of spring 41 and lever 39, against the fulcrum 38, continuing the bending of the first fold. The shoe 33 is now withdrawn to permit jaw 28 to advance and finish the terminal bend by flattening the first fold against the standing part or stock of the tube, Fig. 4.

Another feature of my invention is the improved recess 34 of shoe 33. It will be noted in Fig. 1 that the bottom of recess 34 forms an angle of about 10° with face 36. The purpose of this construction is to make face 36 act as a cam or cam flank against the upper face of jaw 27, to lift the bottom of recess 34 away from the fold in the return movement of the shoe, as indicated in Figs. 3 and 5. In the old construction of this part, the bottom of the recess was parallel with face 36, and the fold would often be dragged back by the shoe, producing a defective fold or no fold at all. This trouble is entirely eliminated by the new construction.

Figure 8:
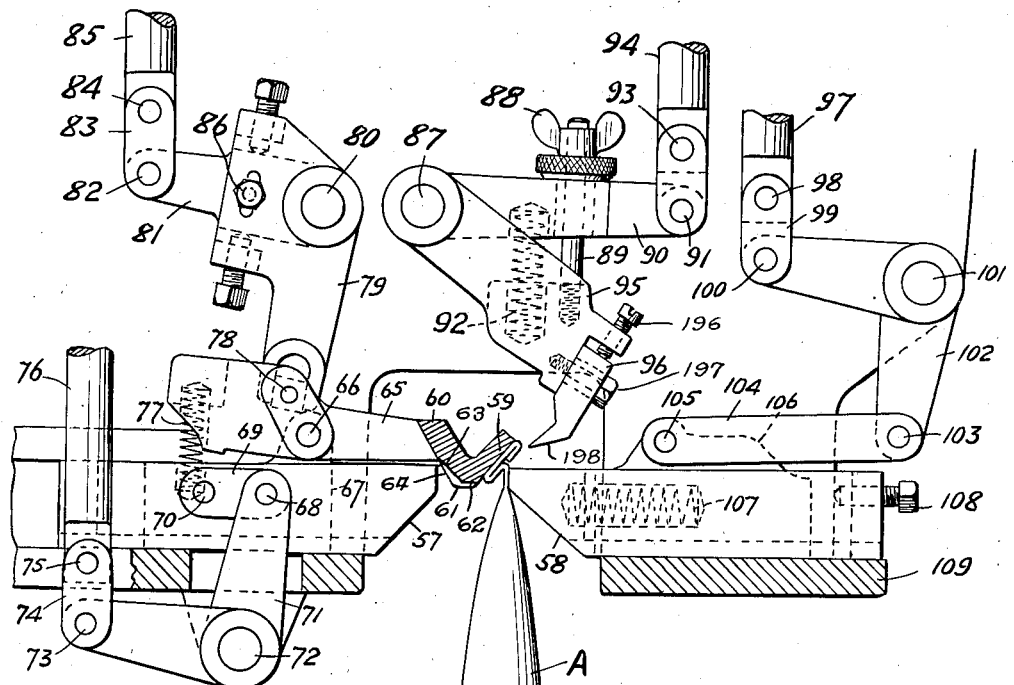
Fig. 8 is a view in side elevation, with parts in vertical cross-section, at the second station.

From the above-described closing station, the tube is transferred to the tuck-folding station shown in Fig. 8. The jaws 57 and 58 are open during the indexing of the dial 21, but they close as soon as the tube is lifted by the cup-lifter 110 to the position shown in Fig. 6, so that the exact amount of stock is provided above the faces of jaws 57 and 58 to make the tuck on the one side equal to the length of the terminal bend on the other side. Naturally, the folds are not made exactly the same length for every size of tube, nor is it always practical to make them the same length for all materials and makes, and I have, therefore, provided adjustment in the linkage between the cup-lifter 110 and its operating cam. A preferred adjustment is seen in Fig. 8 where a threaded stud 199 is shown fastened into stem 111 of cup-lifter 110. Stud 199 passes through block 203 and is adjustable up or down in relation to this block by means of nuts 200 and 204. The block 203 swivels on trunnions 202 in slot 205 of the forked lever 201 which is connected in the usual manner through linkage to a suitable cam on the shaft operated by gear 24 (Fig. 18). It is evident that any change in the length of the first fold, Fig. 2, will be multiplied by four in the position of the tube in Fig. 6, and this must be compensated for by adjusting the lifter 110. The same adjustment is also used to take care of the different lengths of tubes closed on the machine.

In making the tuck, a crease is made in the stock by creaser 96, as shown in Fig. 7. As seen in Fig. 8, the creaser 96 is adjustably mounted on arm 95 by means of screws 196 and 197 so that the creaser 96 can be set the proper distance from the face of jaw 57 to prevent the edge of creaser 96 from scoring or cutting the stock. Creaser 96 has a sharp, wedge-shaped face 198. It will also be noted that the creaser-arm 95 is fulcrumed at 87, Fig. 8, so that the point of creaser 96 moves in against the stock with a circular movement or on an arc, striking the stock at a distance from the face of jaw 57 approximately equal to the required length of stock in the fold, and bending the stock between the jaw 57 and folder-face 59 into a tuck. The reason for this construction is to avoid having the creaser point slip or slide on the stock, which would cause serious trouble because of uneven folds. The creaser-arm 95 is yieldably connected to lever 90 by a spring 92 to provide compensation for variations in stock thickness. This connection is also made adjustable through the stud 89 and nuts 88, so as to furnish adjustment for varying the length of the fold produced. The lever 90 is actuated through pins 91, 93 and rod 94 by a properly shaped cam.

Figure 9:
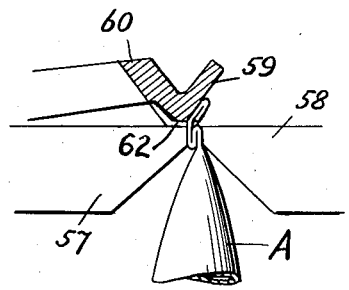
Figs. 9, 10, 11 and 12 are detail views, with parts in vertical cross-section, showing the intermediate and final steps in forming the tuck, at the second station.
Figure 10:
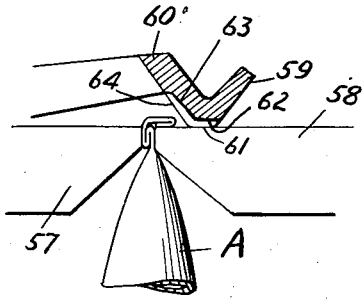

The tuck folder 60 is held at this stage, Fig. 7, in such a position on jaw 57 that face 59 will co-operate with creaser 96 in producing the tuck, and face 59 remains in that position while the creaser 96 swings up and the jaw 57 slides back out of the way so that, by the combined action of spring 77 and lever 79 on folder-arm 65, the tuck folder 60 swings on fulcrum 66 down between the tube and the jaw 57, taking the position shown in Fig. 8, thus continuing the bending of the tuck. Jaw 57 advances again, as shown in Fig. 9, to close the tuck against the central stock by clamping the folds against jaw 58. The tuck folder advances to co-operate in this action and continues to advance finishing the 90° bend, Fig. 10, of the stock over the face 61 of jaw 58, which jaw, during the entire previous cycle of operation, has remained stationary. In the passage of tuck folder 60 from the position of Fig. 9 to the position of Fig. 10, the folded end of tube A passes through the recess 62 (Figs. 9 and 10). Referring to Fig. 8, the tuck folder 60 is actuated by lever 79 which is connected through linkage 81—82—83—84 to cam rod 85. Adjustment for the proper position of tuck folder 60 is provided for by having lever 79 in two parts, pivoted at 80 and clamping the two parts together with screw 86 after the adjustment is made.

Figure 11:
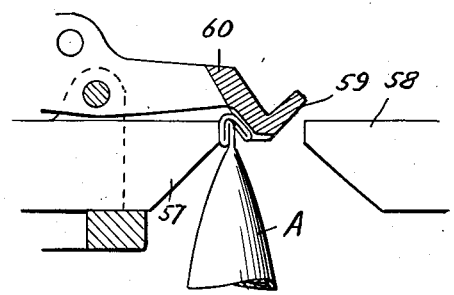

With the tuck folder 60 in the position shown in Fig. 10, the jaw 58 is withdrawn from the position under it, and the tube folder 60 is permitted to drop down again between the jaws and the tube, but this time on the opposite side of the tube, bending the terminal bend as indicated in Fig. 11. It should be noted in Figs. 9 and 10 that the same type of construction in regard to the recess 62 and the second face 63 having the sides 64 is carried out on the tuck folder 60 as was described for folder shoe 33 and for the same reasons and purpose. The faces 59—61—64 of tuck folder 60 thus constitute cam flanks for the operating surfaces of a cam.

Figure 12:
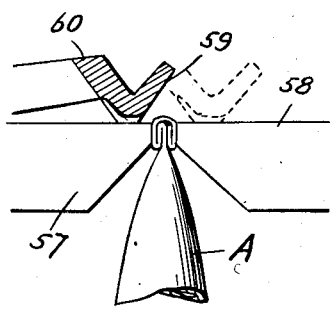

The folds are finished by closing the jaw 58 again, Fig. 12, clamping the folds against jaw 57.

The front jaw 58 is yieldably actuated through the linkage shown in Fig. 8 by cam rod 97 through linkage 98—99—100—101—102—103—104—105—106 and spring 107. The advance of jaw 58 towards the tube is limted by the set screw 108 striking against the housing 109.

The rear jaw 57 is rigidly controlled through the linkage 70—69—68—71—72—73—74—75 which is actuated by cam rod 76.

Figure 14:
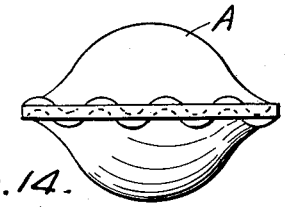
Figs. 13 and 14 are, respectively, a side elevation and end view of a tube made by my machine.
Figure 13:
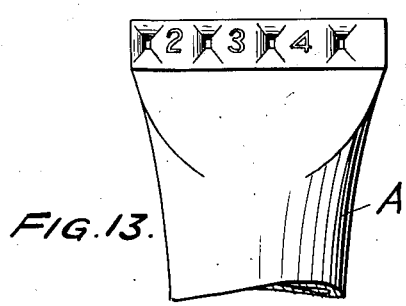

The crimping or indenting of the folds, shown in Figs. 13 and 14, is performed at the next station, or the crimping station, by the movable presser jaw 125 closing in on the tube-folds placed between the punch 126, attached to jaw 125, and the punch 127 attached to the housing. At this station, Fig. 18, the tube is also lifted by the adjustable cup-lifter 139, to insure that the indentations are placed in the center of the folds regardless of the width of folds used. The presser jaw 125 is actuated from cam 116 through lever 121 and link 122. It is of greatest importance to have the movement of jaw 125 adjustable, so that the depth to which the punch is pressed into the folds can be regulated. The link 122 is, therefore, not connected directly to the jaw 125 but to an adjusting block within the jaw 125, and the adjustments are made by means of the screw 124.

Referring to Figs. 15 and 16, other features of my invention are the methods and means provided for adjustably holding the type used in pressing code numbers or characters in exact position into the beads of the crimped closure. The type 129 is held in spaced relation to the indentations by means of recesses in punch 127 which is mounted on housing 140 as shown in Figs. 15 and 16. The type must also be adjustable so that the impressions made will not be deep enough to cut through the thin wall of the tube. The means for adjusting and clamping the type is combined in block 128. By this simple arrangement, a very effective clamp and convenient adjustment is provided, it only being necessary to slightly loosen the screws 130 holding punch 127 to the housing, and move the adjusting screw 131 in or out as required. Six characters 129 are provided for, each in a separate recess with the partitions between them of less height than the type. When the screws 130 are tightened, the type 129 is clamped against housing 140 between the punch 127 and that portion of block 128 overlying the type 129. A backing for the type is provided by the head 132 of block 128.

I do not intend to be limited save as the scope of the prior art and of the attached claims may require.

I claim:

1. In a collapsible tube machine, means for conveying a plurality of tubes, closing jaws located adjacent said means to receive between said jaws an end of each of said tubes in succession, means for moving said jaws to flatten and close said end of the tube between said jaws, and means synchronized with said last-mentioned means for lifting said tube during the flattening operation, said lifting being proportionate to the decrease in length of said tube due to said flattening and closing.

2. In a collapsible tube machine, means for conveying a plurality of tubes, closing jaws mounted adjacent said means to receive in succession a flattened end of each of said tubes between said jaws, a folder shoe mounted adjacent said jaws and co-operating with said jaws to close and bend said flattened end of said tube, a face on said folder shoe co-operating with one of said jaws to lift said folder shoe relative to said jaw, said folder shoe having a recess therein adjacent said face to receive a portion of said tube therein, said recess having a bottom at an angle to said face so that movement of said face on said jaw lifts said folder shoe clear of said end of the tube between said jaw and said folder shoe, and means for actuating said jaws and said folder shoe.

3. In a collapsible tube machine, means for conveying a plurality of tubes, jaws mounted adjacent said means for receiving in succession an end of each of said tubes between said jaws, a tuck folder mounted adjacent said jaws for co-operation with said jaws, a creaser mounted separately from said tuck-folder having a sharp wedge-shaped face, and means for operating said creaser to form a tuck against said tuck folder in a flattened portion of a tube held by said jaws by contacting said creaser with said flattened portion of said tube at a distance from said jaws substantially equal to the width of said tuck so that said creaser does not slide on said flattened portion of said tube.

4. In a collapsible tube machine, according to claim 3, a pivot on which said creaser is mounted so as to move in a circular arc toward and away from one face of said tuck folder.

5. In a collapsible tube machine, means for conveying a plurality of tubes, jaws mounted adjacent said means to receive in succession a flattened end of each of said tubes between said jaws, a tuck folder mounted adjacent said jaws for co-operation therewith, a cam face on said tuck folder co-operating with one of said jaws, said tuck folder having a recess therein adjacent said face and having a bottom at an angle to said face so that, upon movement of said tuck folder relative to said jaw, said cam face lifts said tuck folder away from the flattened portion of the tube between said jaw and said tuck folder, a second face on said tuck folder at an angle to said cam face, and means for operating said jaws and said tuck folder.

6. In a collapsible tube machine, means for conveying a plurality of tubes, a pair of reciprocating jaws for receiving in succession a flattened end of each of said tubes between said jaws, a tuck folder mounted on one of said jaws, a cam face on said tuck folder, said tuck folder having a recess therein adjacent said cam face and having a bottom at an angle to said cam face so that, upon movement of said tuck folder relative to said jaw, said cam face lifts said tuck folder away from that part of the flattened portion of the tube which is between said jaw and said tuck folder, a second face on said tuck folder at an angle to said cam face and at an angle to and opposite the other of said jaws, a creaser having a sharp, wedge-shaped face, a pivot for said creaser such that movement of said creaser causes said creaser to engage said flattened portion of the tube engaged by said jaws at a point spaced above said jaws a distance equal to the width of a tuck being formed in said tube and to press said tube against said second face of said tube folder so that said creaser does not slide on said tube, and means for actuating said jaws, said tuck folder and said creaser.

7. In a collapsible tube-closing machine: means for conveying a plurality of tubes; punches having opposite, interlocking, serrated faces; said punches being mounted adjacent said means to receive in succession a folded portion of each of said tubes between said punches; type located in the face of one of said punches; means for adjusting the location of said type relative to said face; and means mounted to actuate said punches to crimp said folded portion of each of said tubes in succession between said punches.

8. In a collapsible tube-closing machine, a punch having a serrated face for indenting a folded portion of a tube, type in said serrated face of said punch, fastening means for attaching said type to said punch, and adjusting means for varying the position of said type relative to said serrated face of said punch.

9. In a collapsible tube-closing machine, a punch having an irregular face, type located in a recess in said punch and projecting from said irregular face, a block in said recess having a wall interposed between said type and punch, bolts for clamping said type and said block to said punch, and a screw mounted in said punch for adjusting said block and said type relative to said irregular face when said bolts are loose.

10. In a collapsible tube machine, means for conveying a plurality of tubes, jaws mounted adjacent said means to receive in succession a flattened end of each of said tubes between said jaws, a tuck folder mounted adjacent said jaws for co-operation therewith, said tuck folder being of upright V-shape in vertical longitudinal cross-section, a creaser mounted for movement adjacent said jaws and said tuck folder, and means for operating said jaws and said tuck folder and said creaser.

11. In a collapsible tube-closing machine, means for conveying a plurality of tubes, jaws mounted adjacent said means for receiving in succession an end of each of said tubes between said jaws, a tuck folder mounted adjacent said jaws for co-operation with said jaws, a creaser mounted independently from said tuck folder, means for operating said creaser to form a tuck against said tuck folder in a flattened portion of a tube held by said jaws, means for operating said jaws and said tuck folder to bend and flatten said tuck against the side of said tube, means for operating said tuck folder to bend the stock of said tube remaining over the face of said jaws against the face of one of said jaws, and means for operating said jaw and said tuck folder to continue said bend and flatten said bend against the said tube.

12. In a collapsible tube-closing machine, first means for conveying a plurality of tubes in spaced relation, closing and folding means mounted adjacent said first means for receiving the open end of each of said tubes in succession to, first, flatten a portion of said tube to provide stock for the folds, and, second, make the first fold, means mounted adjacent said first means for receiving in succession the end of each of said flattened tubes to, first, form a tuck in said stock and flatten said tuck into a fold against the flat stock of said tube on the one side and, second, bend and flatten the said first fold against the other side of the flat stock of said tube, and crimping means mounted adjacent said first means for receiving the closed end of said tubes in succession to crimp the closure.

13. In a collapsible tube machine, a rotatable dial for conveying a plurality of tubes, a pair of reciprocating closing jaws mounted above and adjacent said dial to receive an end of each of said tubes in succession between said jaws, means for reciprocating said jaws to flatten and close said end of said tubes between said jaws, a plurality of tube cups mounted in said dial each receiving a tube therein, a linkage for lifting each of said tube cups in succession, and a cam synchronized with said means for actuating said jaws, said cam operating said linkage to lift one of said tube cups during the flattening operation of said closing jaws a distance proportional to the decrease in length of said tube due to said flattening and closing.

CHARLES J. WESTIN.